UNITED STATES PATENT OFFICE.

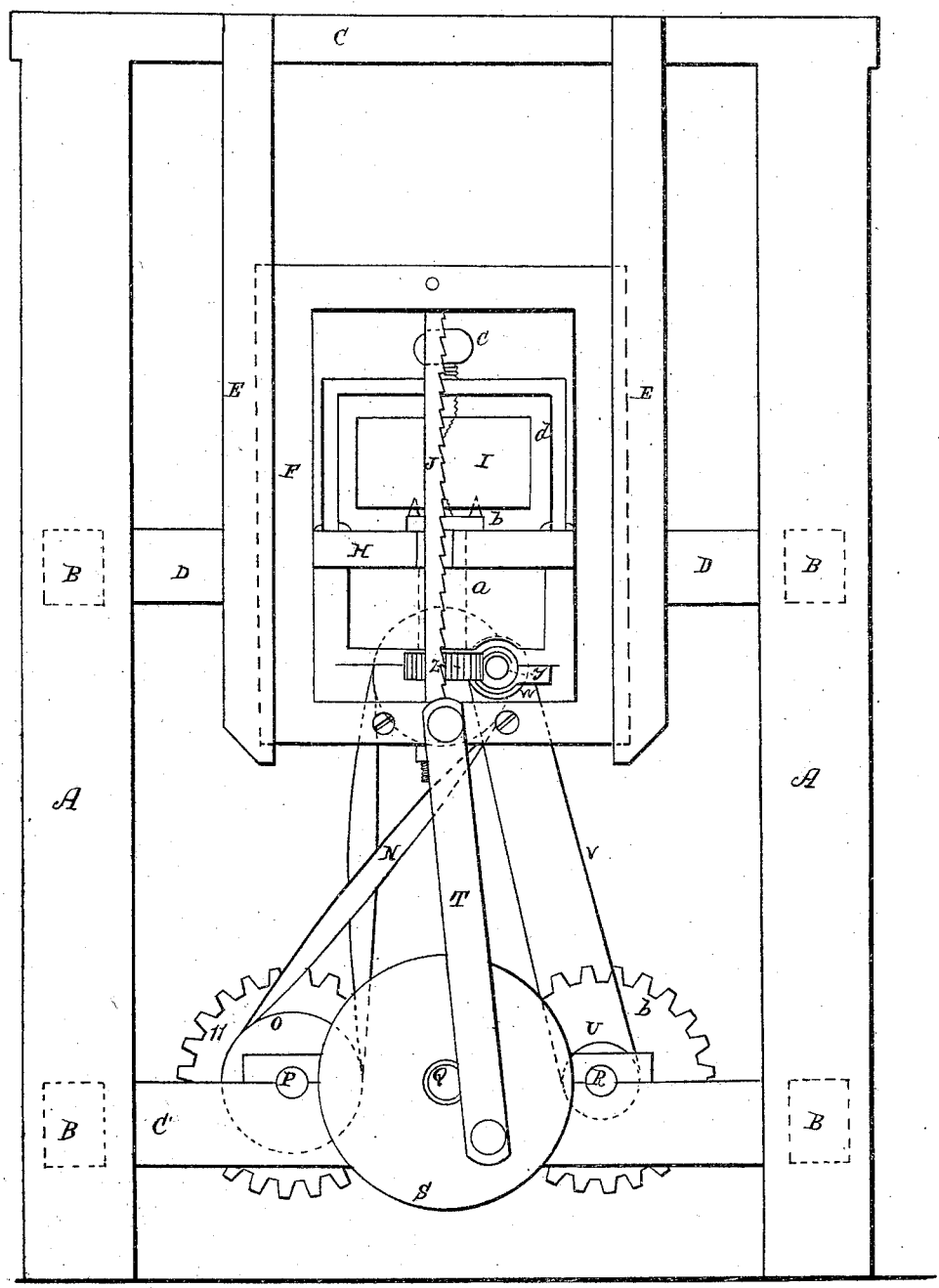

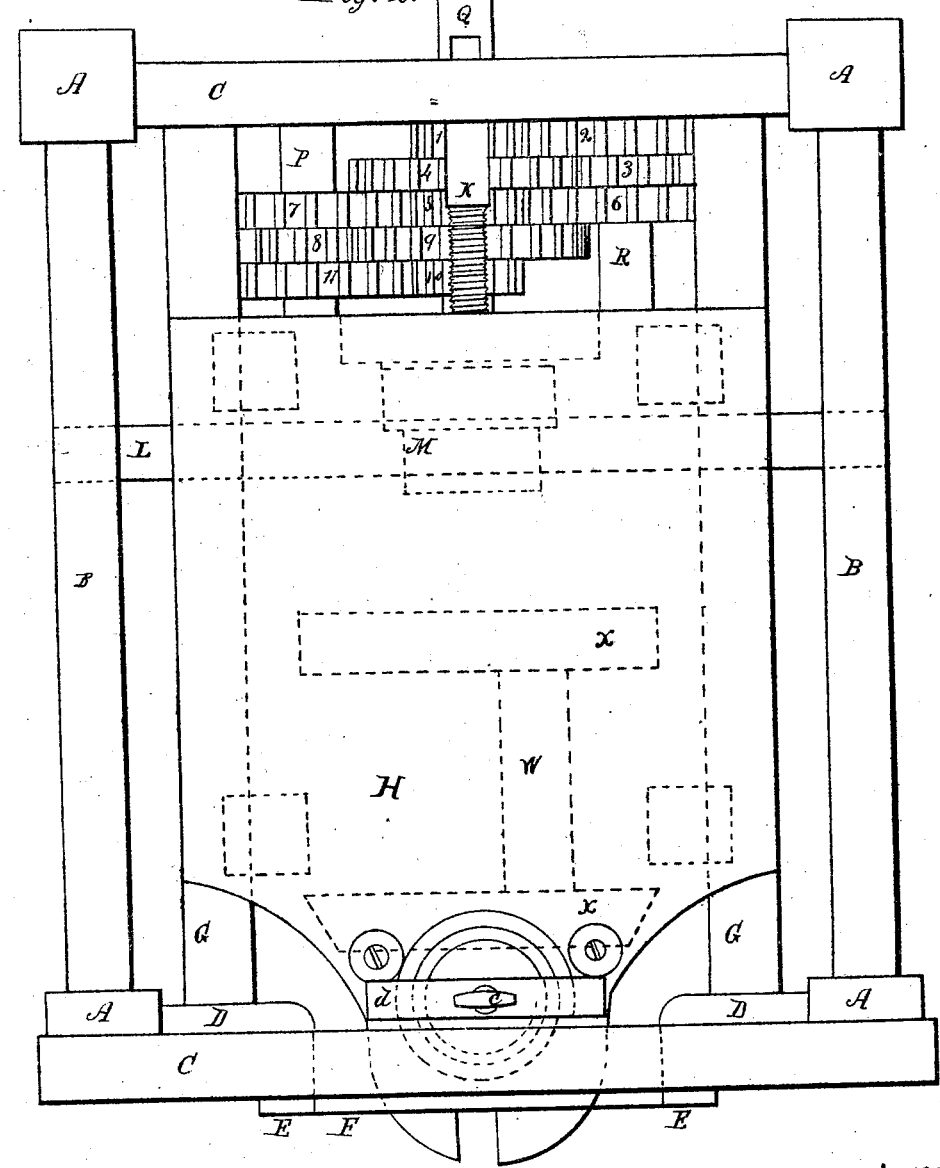

ISAAC T. BARKER, OF MONTVILLE, AND BENJ. F. BARKER, OF BELFAST, MAINE.

MACHINE FOR SAWING VENEERS SPIRALLY FROM THE LOG.

Specification of Letters Patent No. 27,420, dated March 13, 1860.

*To all whom it may concern:*

Be it known that we, I. T. BARKER, of Montville, and B. F. BARKER, of Belfast, and both in the county of Waldo and State of Maine, have invented a new, useful, and Improved Machine for Sawing Blocks Spirally from the Periphery in Toward the Center; and we do hereby declare that the same is described and represented in the following specifications and drawings.

To enable others skilled in the art to make and use our improved machine we will proceed to describe its construction and operation referring to the drawings in which the same letters indicate like parts in each of the figures.

Figure 1 is an elevation of the front end of the machine.

The nature of our improved machine consists in a machine having a traversing carriage carrying devices to hold and rotate the block to be sawed and feed it to a traversing saw, so as to saw it spirally from the periphery of the block in toward the center, so that after it is sawed the board or stuff sawed, may be steamed and unrolled or unwound, like a roll of ribbon or cloth and pressed flat and dried for use.

In the accompanying drawings A, A, A, A, are four posts connected by the side bars B, B, and, end bars C, C', so as to form a strong frame, to which the other parts are fastened or connected.

D, D, are two short pieces fastened to the posts A, A, to hold the lower ends of the ways E, E, in which the saw frame or sash F, traverses, the upper ends of the ways being fastened to the bar C, and the inside edges of the ways are grooved to receive the edges of the frame F, which traverses in them. The pieces D, D, also support the ends of the ways G, G, their opposite ends being supported by the bar C, at the rear end of the frame; on which ways the carriage H, traverses being grooved at each edge, so as to fit the ways and retain its position when traversed to feed the block I, to the saw J, in the frame F.

The carriage H, is traversed by the screw K, working in a nut at the rear end of the carriage; which screw turns in a box fastened to the under side of the bar C, and in the bar L, fastened to the bars B, B, and has the pulleys M, fastened to it to turn it, by the band N, from the pulleys O, on the shaft P, which shaft turns in the lower end bars C, C, parallel, to the the main shaft Q, which turns in the same bars as does also the shaft R, and the end of the shaft Q, may be provided with a pulley or gear by which the machine may be operated. The opposite end of the shaft Q, carries the crank wheel S, which traverses the saw frame F, by means of the link T, which connects the wheel to the frame.

To reduce the motion of the shafts P, and R, and turn them slower than the shaft Q, the pinion 1, is fastened to the shaft Q, and turns the gear 2, which turns loose on the shaft R, and carries the pinion 3, which turns the gear 4, which turns loose on the shaft Q, and carries the pinion 5, which turns the gear 6, fastened to the shaft R to turn it, which shaft carries the pulley U, and band V, to turn the pulley W, which has a shaft turning in boxes X, X, fastened to the underside of the carriage H. The shaft of the long pulley W, has a male screw Y, on it which works into the gear Z, on the shaft *a*, shown by dotted lines in Fig. 1, which shaft has a collar *b*, fastened to its upper end and provided with spurs which enter the block I, so as to turn it and feed it to the saw J.

The upper end of the block I, turns on the conical end of the screw *c*, in the frame *d*, which frame is firmly fastened to the top of the carriage H. The pinion 5, also turns the gear 7, which turns loose on the shaft P, and carries the pinion 8, which turns the gear 9, which turns loose on the shaft Q, and carries the pinion 10, which turns the gear 11, fastened to the shaft P, to operate it and turn the pulleys O, and operate the screw K, as heretofore described, so that when the machine is operated the carriage H, is moved toward the saw and carries the block I, while the male screw Y, turns the block, so that the saw begins to cut on the periphery of the block and as the block rotates and is carried toward the saw, the saw cuts into it spirally around and around the block gradually approaching toward its center, so that the board or stuff sawed from the block may be unrolled or unwound like a roll of ribbon or cloth, so that the width of the board sawed depends on the size of the block and the thickness of the board it is sawed into. The board sawed may move around the block and saw until the saw gets into the spur collar *b*, which carries the block, when the saw may be released from the frame and slipped out and the block and board removed, steamed and unrolled, and pressed flat, but should not be pressed so tight, but that it will slip as it dries and contracts otherwise it would be likely to split and draw apart as it dries. After the block and board are removed from the carriage the band N, may be thrown off and a crank applied to the screw K, to draw the carriage back ready to receive another block.

In using this machine a very narrow saw, or a saw which is the section of a cylinder is required, with its back thinner than its edge, unless the teeth are set, so to cut a wide kerf. We prefer a saw which is the section of a cylinder with teeth having long spaces between their points, so as to allow the saw dust to be carried out freely after it is cut. A section of a saw such as we prefer is shown in Fig. 3.

Our improved machine will saw green or dry wood without steaming, and saw the stuff of such a thickness as may be required, in one-half the time heretofore required, and with one-half the labor. Besides, the machine can be made for one-half the cost of those heretofore used for the same purpose, and is far more durable and far less likely to get out of order.

We believe we have described and represented our improved machine for sawing logs or blocks spirally from the periphery in toward the center, so as to enable any person skilled in the art to make and use it. We will now state what we desire to secure by Letters Patent.

We claim—

A traversing carriage carrying the devices substantially such as are described, for holding and rotating the block and feeding it to the saw so as to saw it spirally from the periphery in toward the center substantially as described.

ISAAC T. BARKER.
BENJ. F. BARKER.

Witnesses:
O. H. KEEN,
H. W. CUNNINGHAM.